United States Patent
Knoll

(10) Patent No.: US 11,614,376 B2
(45) Date of Patent: Mar. 28, 2023

(54) DEVICE FOR CONVERTING A PRESSURE INTO AN ELECTRIC SIGNAL, AND ELECTRONIC PRESSURE MEASURING DEVICE COMPRISING SUCH A DEVICE

(71) Applicant: IFM ELECTRONIC GMBH, Essen (DE)

(72) Inventor: Guido Knoll, Wangen (DE)

(73) Assignee: IFM ELECTRONIC GMBH, Essen (DE)

( * ) Notice: Subject to any disclaimer, the term of this patent is extended or adjusted under 35 U.S.C. 154(b) by 205 days.

(21) Appl. No.: 17/257,699

(22) PCT Filed: Jul. 3, 2019

(86) PCT No.: PCT/EP2019/067896
§ 371 (c)(1),
(2) Date: Jan. 4, 2021

(87) PCT Pub. No.: WO2020/007936
PCT Pub. Date: Jan. 9, 2020

(65) Prior Publication Data
US 2021/0293646 A1    Sep. 23, 2021

(30) Foreign Application Priority Data

Jul. 6, 2018    (DE) ..................... 10 2018 116 476.9

(51) Int. Cl.
*G01L 19/00* (2006.01)
*G01L 19/06* (2006.01)

(52) U.S. Cl.
CPC ...... *G01L 19/0046* (2013.01); *G01L 19/0645* (2013.01)

(58) Field of Classification Search
None
See application file for complete search history.

(56) References Cited

U.S. PATENT DOCUMENTS 7,555,957 B2 * 7/2009 Toyoda ................... G01L 23/18
73/715
2013/0305834 A1 11/2013 Brode et al.

FOREIGN PATENT DOCUMENTS

| CN | 101377426 A | 3/2009 |
|---|---|---|
| CN | 107923806 A | 4/2018 |

(Continued)

OTHER PUBLICATIONS

Chinese Office Action regarding Chinese Patent Application No. 201980058075.6, dated Dec. 23, 2021.

*Primary Examiner* — Octavia Davis Hollington
*Assistant Examiner* — Jermaine L Jenkins
(74) *Attorney, Agent, or Firm* — Harness, Dickey & Pierce, P.L.C.

(57) ABSTRACT

The disclosure relates to a device for converting a pressure into an electric signal. The device has a first deformation body in the form of a first membrane, via which the pressure can be introduced into the device, and a second deformation body in the form of a second membrane, by means of the deflection of which the applied pressure can be converted into an electric signal. The device has a force transmitting means for transmitting pressure and/or tensile forces from the first deformation body to the second deformation body. Either the force transmitting means is designed as a separate part and the two membranes have a bore into which the force transmitting means is at least partly introduced and in which the force transmitting means is connected to the respective membrane, or the force transmitting means is integrally formed with one of the two membranes and the corresponding other membrane has a bore into which the force transmitting means is at least partly introduced and in which the force transmitting means is connected to said membrane.

14 Claims, 5 Drawing Sheets

(56) References Cited

FOREIGN PATENT DOCUMENTS

| DE | 102009024576 A1 | * | 11/2010 | ......... G01L 19/0645 |
|----|----|----|----|----|
| EP | 2251664 A2 | | 11/2010 | |
| EP | 2720021 A2 | | 4/2014 | |
| EP | 2663847 B1 | | 4/2018 | |
| FR | 1375584 A | | 10/1964 | |

* cited by examiner

DEVICE FOR CONVERTING A PRESSURE INTO AN ELECTRIC SIGNAL, AND ELECTRONIC PRESSURE MEASURING DEVICE COMPRISING SUCH A DEVICE

CROSS-REFERENCE TO RELATED APPLICATIONS

This application is a U.S. National Phase Application under 35 U.S.C. 371 of International Application No. PCT/EP2019/067896, filed on Jul. 3, 2019, which claims the benefit of German Patent Application No. 10 2018 116 476.9, filed on Jul. 6, 2018. The entire disclosures of the above applications are incorporated herein by reference.

FIELD

The disclosure relates to a device for converting a pressure into an electric signal and an electronic pressure measuring device comprising such a device.

BACKGROUND

This section provides background information related to the present disclosure which is not necessarily prior art.

Such devices are usually based on the fact that the pressure causes a deformation of a deformation body provided for this purpose in the device and this deformation is converted into an electric signal. For example, a bending beam can be provided for a pure force measurement, and a membrane for a pressure measurement.

For certain applications, in particular in process and food technology, a front-flush sensor or measuring device is advantageous in which no medium can be accumulated in the otherwise usual connection channel to the deformation body of the device. With sensors of this type, the deformation of a front-flush deformation body, for example a front-flush membrane, is usually transmitted to the actual pressure transducer structure, which for example comprises a silicon element or strain gauges, via a non-compressible transmission means. Such sensors are complex in terms of production with regard to the required oil filling and have further disadvantages, for example the undesired influence of the expansion of the transmission medium on the sensor signal in the case of a temperature increase.

In this regard, EP 2 663847 B1 discloses a device comprising a first deformation body in the form of a first membrane, which is connected to a second deformation body in the form of a second membrane which comprises at least one sensor element. The first deformation body can be deformed by the action of the pressure to be measured. The deformation of the first deformation body is transmitted to the second deformation body via a force transmitting means in the form of a plunger. Here, the deformation of the second deformation body is converted into an electric signal by use of strain gauges. The force transmitting means is configured in two parts, wherein the two deformation bodies each form an integral section of the force transmitting means. The two sections of the force transmitting means are then connected to one another by means of resistance welding. The disadvantage here is the comparatively complex manufacturing process, because in particular the precision in the manufacture of the individual parts has to meet high requirements and must be machined with high precision in the joining and welding process, since the structural design of this device allows practically no tolerance.

SUMMARY

This section provides a general summary of the disclosure, and is not a comprehensive disclosure of its full scope or all of its features.

The object of the disclosure is to provide a device which, on the one hand, ensures a permanently reliable operation and a high measurement accuracy and, on the other hand, can be produced easily and cost-efficiently.

According to the disclosure, either the force transmitting means is designed as a separate part and the two membranes each have a hole into which the force transmitting means is at least partially inserted and is there connected to the respective membrane, or the force transmitting means is formed integral with one of the two membranes and the corresponding other membrane has a hole into which the force transmitting means is at least partially inserted and connected there to this membrane. By use of one of these configurations of the device the production, in particular the joining of the two deformation bodies, has been considerably simplified because tolerances can be compensated in a simple manner by the force transmitting means within the hole.

In addition, in an electronic pressure measuring device which comprises such a device according to the disclosure, an absolutely front-flush design is guaranteed. Furthermore, there is no need for any sealing elements in the area of the connection point between the device and the process connection of the measuring device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The disclosure is explained below in more detail based on exemplary embodiments with reference to the drawings.

The drawings schematically show:

In the following description of the preferred embodiments, the same reference symbols designate the same or comparable components.

DETAILED DESCRIPTION

Example embodiments will now be described more fully with reference to the accompanying drawings.

Figure 1:
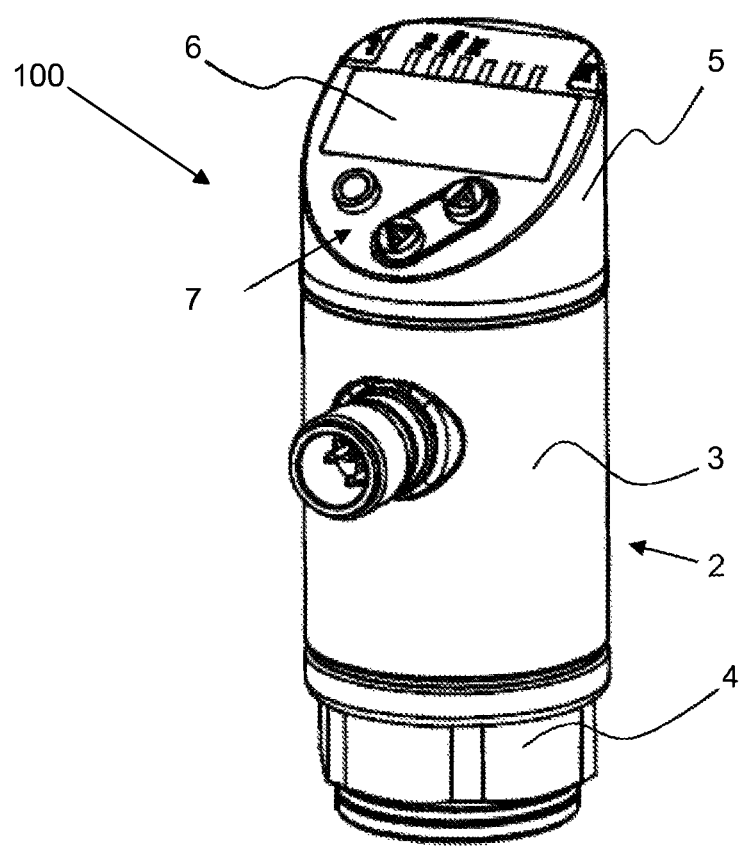
FIG. 1 shows an electronic pressure measuring device.

FIG. 1 shows an electronic pressure measuring device 100 for use in the process measurement technology, which is manufactured and sold by the applicant under the designation PNxxxx. The measuring device 100 consists essentially of a housing 2, which is divided into an upper part 3 and a lower part 4. The lower part, also referred to as process connection, on the one hand, includes the sensor unit in the form of a pressure measuring cell and, on the other hand, enables the mechanical connection of the measuring device 100 to the container or pipe containing the medium. In the upper part 3 the electronic unit is disposed which is provided for the evaluation and processing of the measurement signals supplied by the sensor unit, which can then be tapped via the plug connection shown and forwarded, for example, to a PLC.

A housing head 5 which, among other things, comprises a display 6 and operating elements 7, is placed on the upper part 3. The measuring device 100 is operated via the operating elements 7, i.e. a parameterization or a setting of essential key data, such as the switching points, is carried out. The respective actions are displayed to the user via the display 6.

Figure 2:
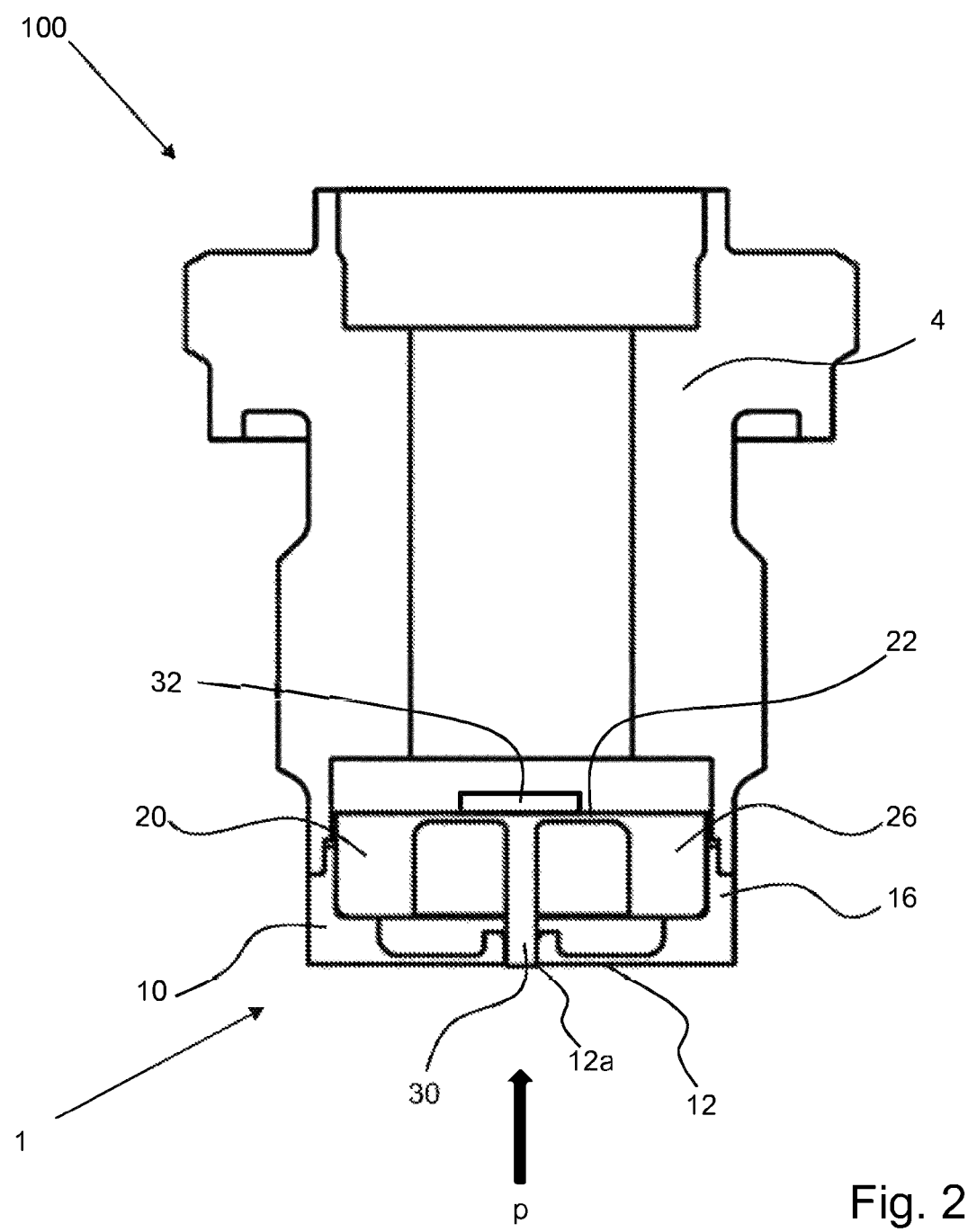
FIG. 2 shows a cross section through a first exemplary embodiment of a device according to the disclosure comprising a process connection of a pressure measuring device.

FIG. 2 shows a cross section through a first exemplary embodiment of the device 1 according to the disclosure within an electronic pressure measuring device 100, which for reasons of illustration—as also in the following FIGS. 3-5—is only shown reduced to the process connection 4. The device 1 comprises a first deformation body 10 which integrally forms a first membrane 12. The first deformation body 10 is essentially formed pot-shaped in that it comprises a circumferential edge 16. In the center or a center point of the preferably circular first membrane 12 a through-hole 12a is provided.

The device 1 comprises a second deformation body 20 which integrally forms a second, preferably circular membrane 22, a force transmitting means 30 and an edge 26. The force transmitting means 30 is formed plunger-like and preferably cylindrical, wherein in principle other shapes, for example an expanding or tapering configuration, are conceivable, too.

The pressure p to be measured is introduced via the surface of the second membrane 12 which is facing away from the second deformation body 20. The force transmitting means 30 is passed through the through hole 12a of the first membrane 12 and is preferably flush with the side of the first membrane 12 facing the medium to be measured. By inserting the force transmitting means 30 into and passing the force transmitting means 30 through the through-hole 12a, tolerances that have arisen during the manufacturing process can be compensated in a simple manner.

The connection of the force transmitting means 30 to the first membrane 12 is preferably made by firmly bonding, in particular by means of welding, alternatively also by soldering or gluing. As a result, a deformation of the first membrane 12 is transmitted via the force transmitting means 30 to the second membrane 22, both in the case of compressive forces and in the case of tensile forces.

On the surface of the second membrane 22 facing away from the first deformation body 10 at least one sensor element 32 is applied, by means of which a deflection of the second membrane 22 can be converted into an electric signal. The sensor element 32 is preferably a strain gauge the electrical resistance value of which changes by expansion and compression. Two sensor elements 32 can be connected to form a half bridge or four sensor elements 32 can be connected to form a full bridge. In addition to strain gauges, for example also piezoelectric elements are conceivable.

The two deformation bodies 10, 20 are positioned opposite to one another in such a way that the edge 16 of the first deformation body 10 engages around the edge 26 of the second deformation body 20. For this purpose, the first deformation body 10 has a shoulder-like taper in the region of the edge 16, on which the edge 26 of the second deformation body 20 rests. Due to the free mobility of the force transmitting means 30 within the hole 12a, the second deformation body 20 can be placed on the first deformation body 10 and both deformation bodies 10, 20 can then be connected to one another tension-free. In addition to the welded connection of the force transmitting means 30 to the membrane 12, the two deformation bodies 10, 20 are welded to one another on the side surfaces which are in contact with each other. However, it is also conceivable that the two edges 16, 26 are welded laid on top of one another.

The first deformation body 10 comprises a step-like widening in the region of the edge 16 on which the process connection 4 rests with a complementary counterpart, so that a cylindrical outer contour is formed in the area of the connection between the device 1 according to the disclosure and the process connection 4. By means of this configuration the first deformation body 10 becomes part of the outer surface of the entire pressure measuring device 100. In the area facing the pressure medium, thus, there is no longer any need for a seal. In addition, an absolutely front-flush design of the pressure measuring device 100 is thereby realized.

Figure 3:
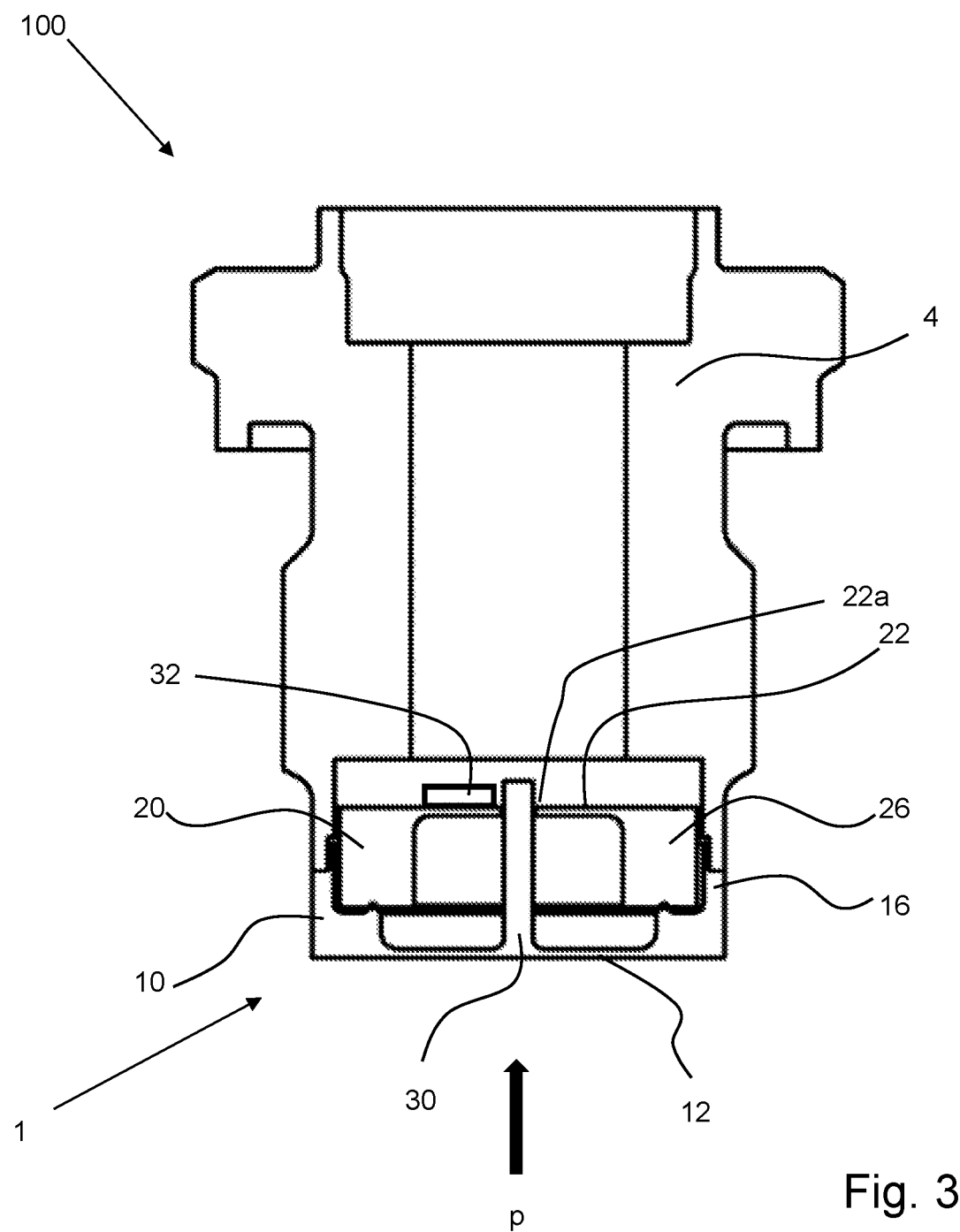
FIG. 3 shows a cross section through a second exemplary embodiment of a device according to the disclosure comprising a process connection of a pressure measuring device.

FIG. 3 shows a cross section through a second exemplary embodiment of the device 1 according to the disclosure within an electronic pressure measuring device 100, which is also shown reduced only to the process connection 4 for reasons of illustration. The basic structure corresponds to the illustration shown in FIG. 2, so that in the following in order to avoid repetitions only differences are discussed.

The main difference to the embodiment according to FIG. 2 is that now the first deformation body 10 in addition to the first membrane and the edge 16 also integrally forms the force transmitting means 30. For this purpose, a through-hole 22a through which the force transmitting means 30 is passed is provided in the center of the second membrane 22. The schematically indicated sensor element 32 then extends accordingly around the through hole 22a.

The connection of the force transmitting means 30 to the second membrane 22 is again preferably made by firmly bonding, in particular by means of welding, alternatively also by soldering or gluing. In this embodiment, the connection can also be realized by threading.

In this embodiment, too, an absolutely front-flush configuration of the pressure measuring device 100 is guaranteed. Furthermore, there is no need for any sealing elements in the area of the device 1, and by inserting the force transmitting means 30 into and through the through-hole 22a any resulting tolerances can be compensated in a simple manner.

Figure 4:
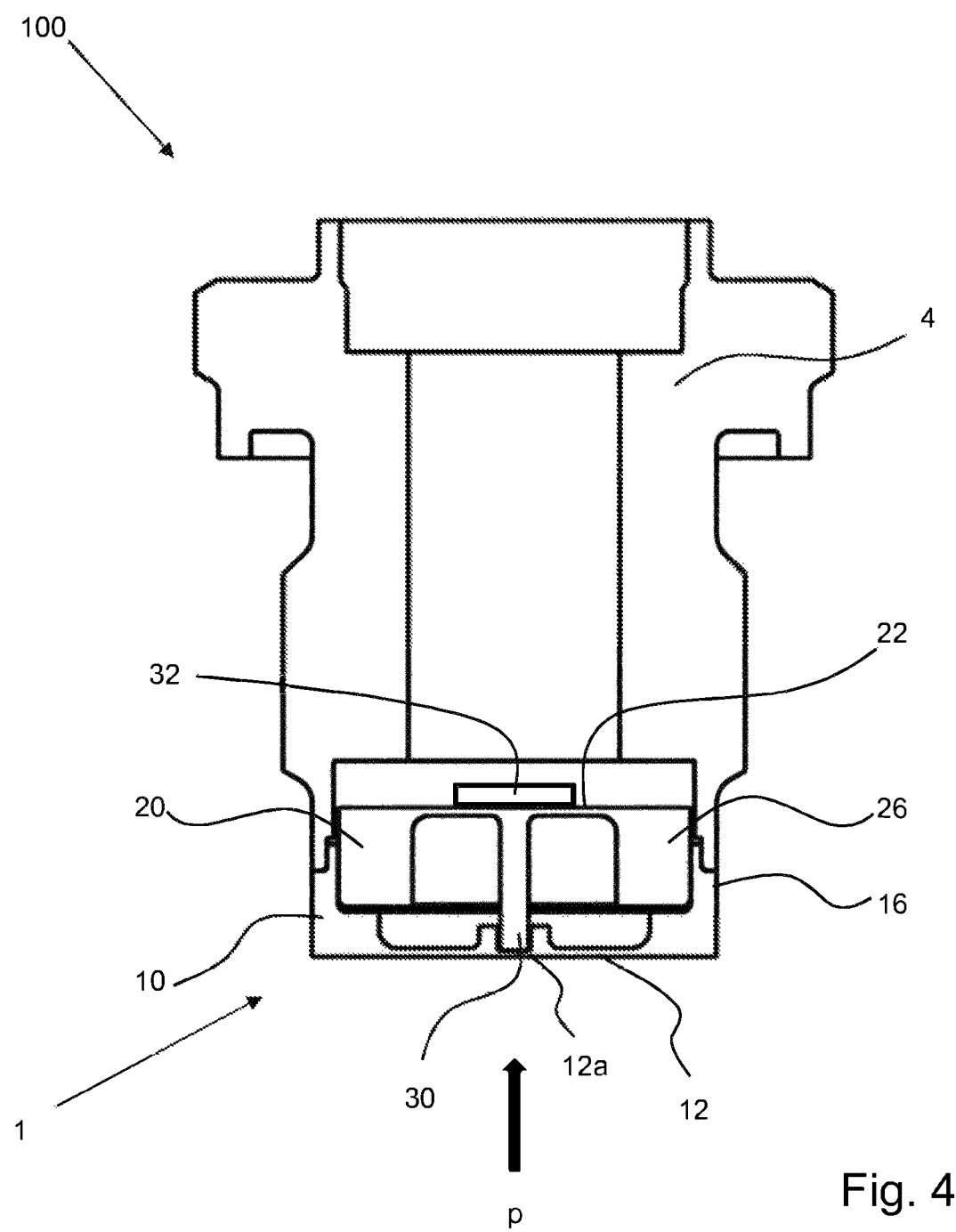
FIG. 4 shows a cross section through a third exemplary embodiment of a device according to the disclosure comprising a process connection of a pressure measuring device.

FIG. 4 shows a modification of the embodiment known from FIG. 2. Here, the hole 12a is not designed as a through hole, but as a blind hole. As a result, the force transmitting means 30 is now not passed through, but only inserted. This embodiment is suitable, for example, in order to connect the force transmitting means 30 to the first membrane 12 by means of a threaded connection. For this purpose, the membrane 12 comprises a corresponding widening around the hole 12a. Alternatively, for example by means of laser welding, a welded connection could come into consideration in which a welding is implemented from below through the membrane 12.

In this embodiment, too, an absolutely front-flush configuration of the pressure measuring device 100 is guaranteed. Furthermore, there is no need for any sealing elements in the area of the device 1, and by inserting the force transmitting means 30 into and through the through-hole 22a, any resulting tolerances can be compensated in a simple manner.

Figure 5:
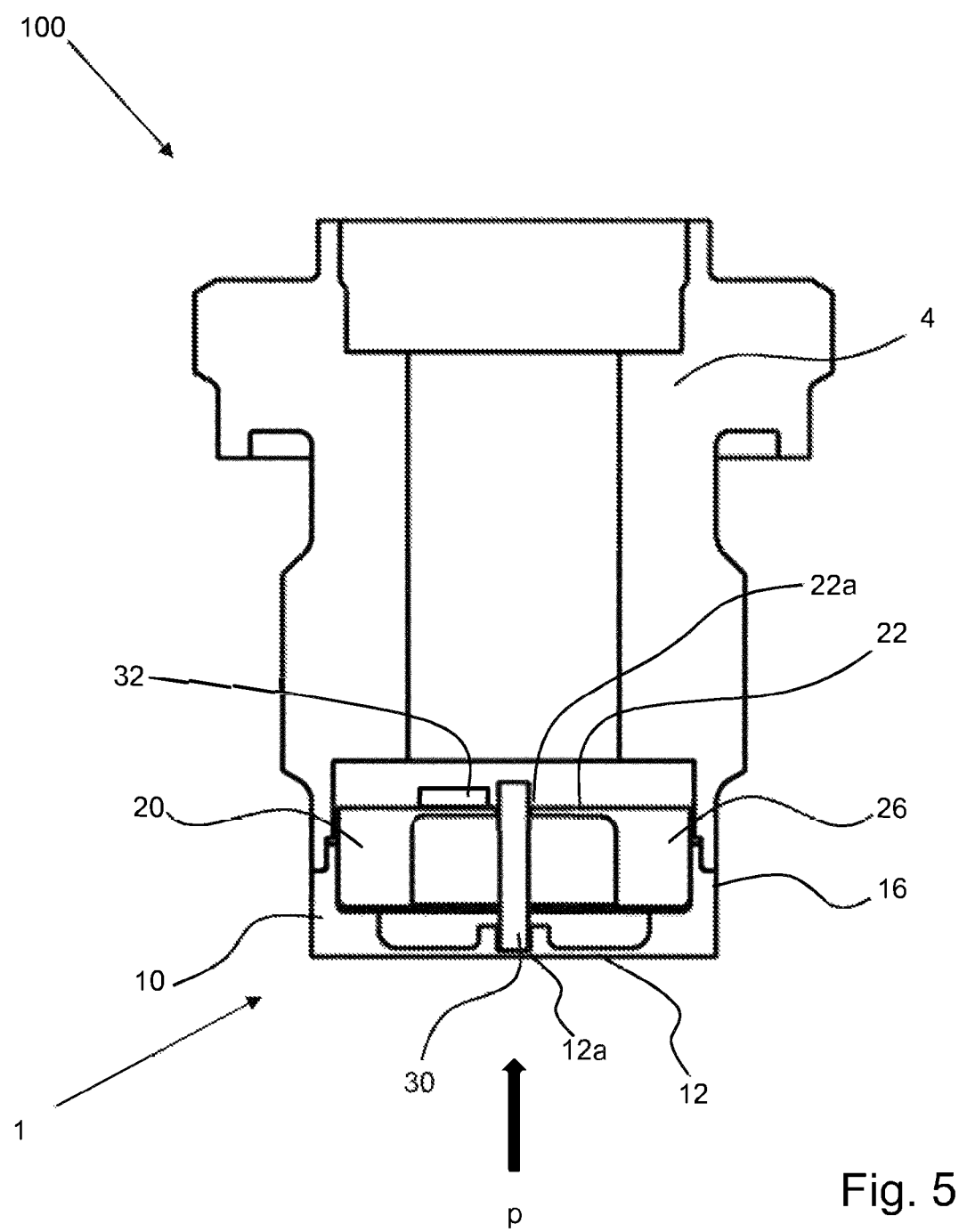
FIG. 5 shows a cross section through a fourth exemplary embodiment of a device according to the disclosure comprising a process connection of a pressure measuring device.

FIG. 5 shows a further embodiment in which the force transmitting means 30 is not formed onto one of the membranes 12, 22 as in FIGS. 2-4, but is formed as a separate part. For this purpose, the two membranes 12, 22 each comprise a through-hole 12a, 22a or, as shown in the figure, a blind hole 12a. The force transmitting means 30 is accordingly inserted in or through these holes 12a, 22a. This embodiment is thus to a certain extent a combination of the connection options described above in FIGS. 2-4 between the membranes 12, 22 and the force transmitting means 30 and further simplifies the manufacturing effort.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A device for converting a pressure into an electric signal, wherein the device comprises a first deformation body in the form of a first membrane, via which the pressure is introduced into the device, and a second deformation body in the form of a second membrane, by means of the deflection of which the applied pressure is converted into an electric signal,
wherein the device comprises a force transmitting means for transmitting compressive and/or tensile forces from the first deformation body to the second deformation body,
wherein
the force transmitting means is designed as a separate part and the two membranes comprise a hole into which the force transmitting means is at least partially inserted, wherein the force transmitting means is connected to the respective membrane at the hole.

2. The device according to claim 1, wherein the force transmitting means respectively connects the two membranes to each other at their centers.

3. The device according to claim 1, wherein the hole is designed as a through hole or as a blind hole.

4. The device according to claim 1, wherein the force transmitting means is connected in the hole to the respective membrane by firmly bonding or by screwing.

5. The device according to claim 1, wherein the first deformation body is formed pot-shaped and engages around the second deformation body.

6. An electronic pressure measuring device, consisting of a process connection, a housing placed on the process connection and a pressure measuring cell for detecting the pressure prevailing in an adjacent medium,
wherein
the measuring cell is configured as a device according to claim 1.

7. The electronic pressure measuring device according to claim 6, wherein the first deformation body comprises a circumferential, step-like widening on its lateral outer surface, on which the process connection rests at its end facing the device so that in the area of the connection between the device and the process connection a cylindrical outer contour is formed.

8. A device for converting a pressure into an electric signal, wherein the device comprises a first deformation body in the form of a first membrane, via which the pressure is introduced into the device, and a second deformation body in the form of a second membrane, by means of the deflection of which the applied pressure is converted into an electric signal,
wherein the device comprises a force transmitting means for transmitting compressive and/or tensile forces from the first deformation body to the second deformation body,
wherein
the force transmitting means is formed integral with one of the two membranes and the corresponding other membrane comprises a hole into which the force transmitting means is at least partially inserted, wherein the force transmitting means is connected to the corresponding other membrane at the hole.

9. The device according to claim 8, wherein the force transmitting means respectively connects the two membranes to each other at their centers.

10. The device according to claim 8, wherein the hole is designed as a through hole or as a blind hole.

11. The device according to claim 8, wherein the force transmitting means is connected in the hole to the respective membrane by firmly bonding or by screwing.

12. The device according to claim 8, wherein the first deformation body is formed pot-shaped and engages around the second deformation body.

13. An electronic pressure measuring device, consisting of a process connection, a housing placed on the process connection and a pressure measuring cell for detecting the pressure prevailing in an adjacent medium,
wherein
the measuring cell is configured as a device according to claim 8.

14. The electronic pressure measuring device according to claim 13, wherein the first deformation body comprises a circumferential, step-like widening on its lateral outer surface, on which the process connection rests at its end facing the device so that in the area of the connection between the device and the process connection a cylindrical outer contour is formed.

* * * * *